United States Patent [19]

Tsuji

[11] Patent Number: 5,186,394
[45] Date of Patent: Feb. 16, 1993

[54] REMOTE CONTROLLED FREELY PIVOTAL NOZZLE

[75] Inventor: Takumi Tsuji, Gifu, Japan

[73] Assignee: Nippon Thompson Co., Ltd., Tokyo, Japan

[21] Appl. No.: 769,421

[22] Filed: Sep. 30, 1991

[30] Foreign Application Priority Data

Oct. 2, 1990 [JP] Japan .................. 2-103355[U]

[51] Int. Cl.⁵ .................................... F16L 27/04
[52] U.S. Cl. ........................... 239/587.4; 239/263.3
[58] Field of Search ............. 239/227, 263.1, 263.3, 239/264, 265, 587

[56] References Cited

U.S. PATENT DOCUMENTS

| | | | |
|---|---|---|---|
| 832,066 | 10/1906 | Larsen | 239/587 |
| 1,230,458 | 6/1917 | Bouëry | 239/587 |
| 1,688,614 | 10/1928 | Cottingham | 239/587 |
| 3,041,748 | 7/1962 | Wetzel | 239/587 |
| 3,724,764 | 4/1973 | Hall | 239/587 |
| 4,350,297 | 9/1982 | Martin | 239/587 |
| 4,662,565 | 5/1987 | Waldrum | 239/227 |
| 4,796,808 | 1/1989 | Linda et al. | 239/587 |

Primary Examiner—Andres Kashnikow
Assistant Examiner—Karen B. Merritt
Attorney, Agent, or Firm—Skjerven, Morrill, MacPherson, Franklin & Friel

[57] ABSTRACT

A liquid spraying apparatus for use in a machining tool or the like for spraying liquid, such as lubricant or washing water, over a desired location is provided. The apparatus generally includes a nozzle assembly and an orientation control unit operatively coupled to the nozzle assembly for controlling the orientation of its nozzle. The nozzle assembly includes a nozzle pipe which is pivotally supported. An L-shaped arm is operatively coupled to the nozzle pipe and also fixedly attached to a transmission member which is operatively coupled to a pair of motors. The transmission member is caused to move linearly back and forth by one of the motors and also caused to rotate back and forth by the other motor, so that the nozzle pipe may be oriented in a desired direction by the operation of the two motors.

5 Claims, 3 Drawing Sheets

REMOTE CONTROLLED FREELY PIVOTAL NOZZLE

BACKGROUND OF THE INVENTION

1. Field of the Invention

This invention generally relates to a pivotal nozzle for use in a machine tool for spraying liquid onto a desired location, and, in particular, to a remote controlled freely pivotal nozzle for spraying liquid onto a desired location for the purpose of cooling a cutting device and/or a work being processed and of reducing a friction so as to provide an enhanced cutting performance.

2. Description of the Prior Art

A typical prior art example of this type of freely pivotal nozzle for use in a machine tool is described in the Japanese Post-examination U.M. Pub. No. Hei 2-553 (U.M. Appln. No. Show 57-19580). As schematically illustrated in FIGS. 5 and 6, this pivotal nozzle includes a movable joint which is generally comprised of a main body 35, a spherical member 38 rotatably housed in the main body 35 and a liquid leak preventing member 37 interposed between the main body 35 and the spherical member 38. The main body 35 is formed at its end with a mounting section 35a which is threaded into a threaded hole provided at a desired location of a machining tool (not shown). A through-hole 38 is provided in the spherical member 38, and a short pipe 40 for ejecting liquid is fixedly fitted into the through-hole 38.

With this structure, the pipe 40 may be oriented in any desired direction manually by holding the pipe 40 and moving the pipe 40 in any desired direction. By setting the direction of the pipe 40 in this manner, desired liquid, such as lubricant or washing liquid, may be sprayed onto a desired location of a machining tool. As a result, the nozzle shown in FIGS. 5 and 6 may be used as a manually pivotable nozzle for spraying desired liquid. In this case, a plurality of such pivotal nozzles are mounted at desired locations of a machining tool.

However, since the above-described nozzle is directed in a desired direction manually, human intervention is required in changing the orientation of the nozzle. Thus, the machining tool must be stopped every time when the direction of one or more of such nozzles is to be changed so as to avoid the possibility of any accident on the part of an operator. In addition, since a relatively large number of such nozzles are provided, it is a time consuming task to set the orientation of such nozzles one by one.

SUMMARY OF THE INVENTION

In accordance with the present invention, there is provided an improved liquid spraying apparatus including a pivotal nozzle whose orientation can be set remotely at any desired direction without halting the operation of a machining tool. The present liquid spraying apparatus includes a nozzle assembly and an orientation control unit which is operatively coupled to the nozzle assembly for automatically controlling the orientation of a nozzle provided in the nozzle assembly. The nozzle assembly includes a main body, a spherical member rotatably housed in the main body and a pipe fixedly attached to the spherical member and in fluidic communication with a through-hole provided in the spherical member, which, in turn, is in fluidic communication with a supply passage formed in the main body. As a result, liquid, such as lubricant, can be supplied from a source to the pipe through the supply passage of the main body and the through-hole of the spherical member.

The orientation control unit is operatively coupled to the pipe such that the pipe may be pivoted in any direction over a predetermined range of angles with the center of the spherical member substantially as a pivotal point. In a preferred embodiment, the orientation control unit includes an arm which is operatively coupled to the pipe through a universal joint, a first driving means for driving to move the arm linearly along a straight line back and forth and a second driving means for driving to move the arm rotationary around a predetermined point so that the pipe may be pivoted in any desired direction.

It is therefore a primary object of the present invention to obviate the disadvantages of the prior art as described above and to provide an improved liquid spraying apparatus.

Another object of the present invention is to provide an improved liquid spraying nozzle assembly which can spray liquid in any desired direction.

A further object of the present invention is to provide an improved liquid spraying nozzle assembly whose orientation can be varied in any desired direction without halting a machining tool on which the nozzle assembly is mounted.

A still further object of the present invention is to provide an improved liquid spraying nozzle assembly whose orientation can be varied without human intervention.

Other objects, advantages and novel features of the present invention will become apparent from the following detailed description of the invention when considered in conjunction with the accompanying drawings.

DESCRIPTION OF THE PREFERRED EMBODIMENTS

Figure 1:
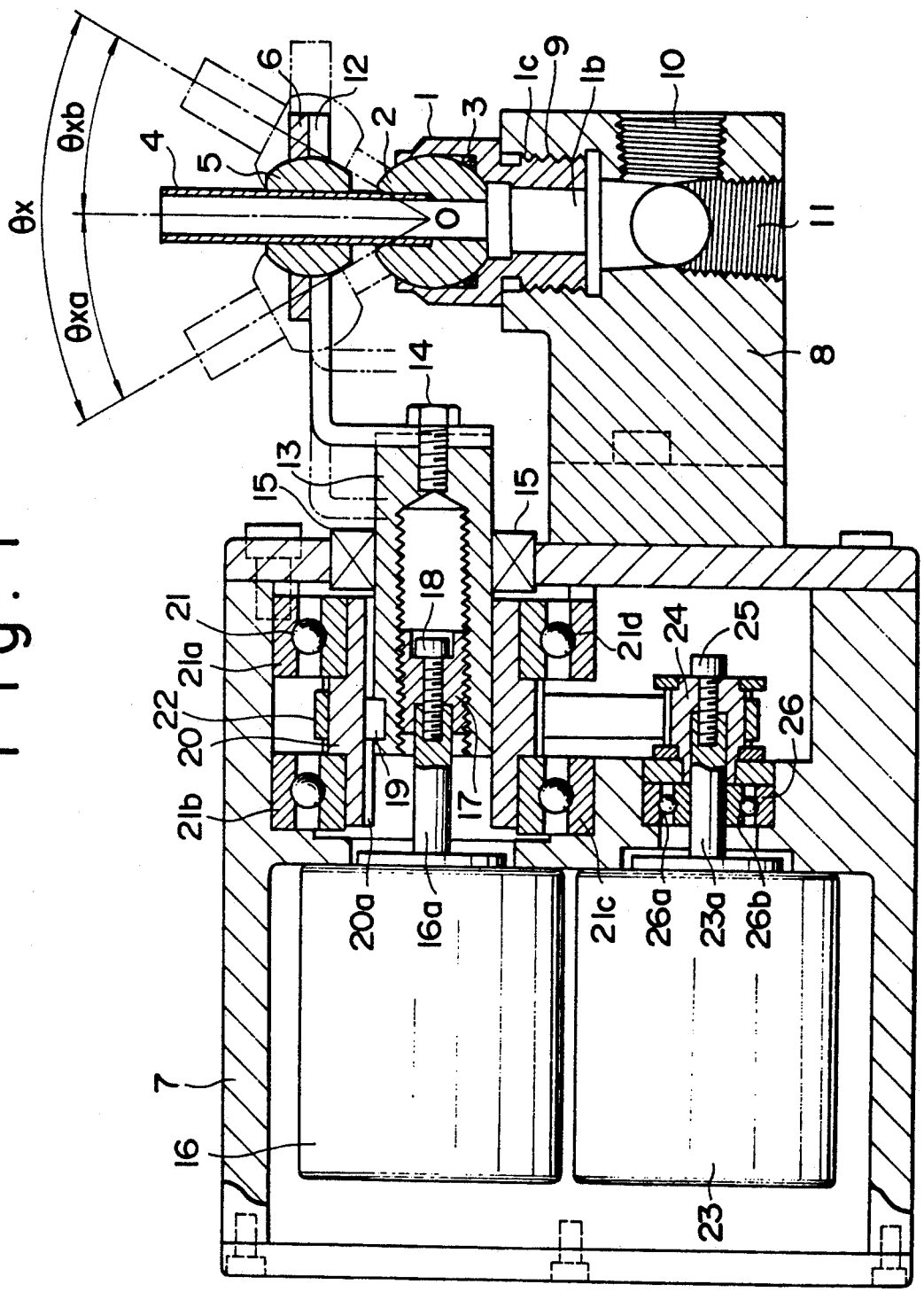
FIG. 1 is a schematic illustration showing in front cross sectional view a liquid spraying apparatus constructed in accordance with one embodiment of the present invention.

Referring now to FIG. 1, there is schematically shown a liquid spraying apparatus constructed in accordance with one embodiment of the present invention. As shown, the present liquid spraying apparatus generally includes two main parts, i.e., a liquid spraying nozzle assembly 1 shown generally in the right-hand half of FIG. 1 and an orientation control unit operatively coupled to the nozzle assembly for controlling the orientation of the nozzle and shown generally in the left-hand half of FIG. 1.

Figure 4:
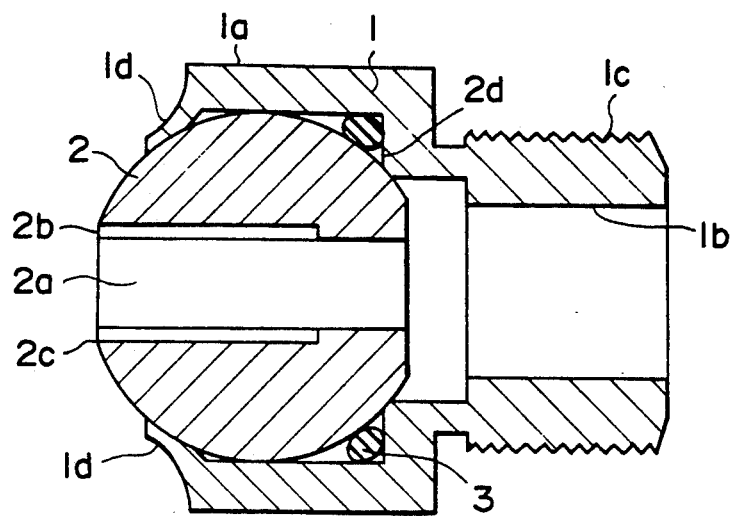
FIG. 4 is a schematic illustration showing in cross section on a somewhat enlarged scale a part of the nozzle assembly of the apparatus shown in FIG. 1.
Figure 5:
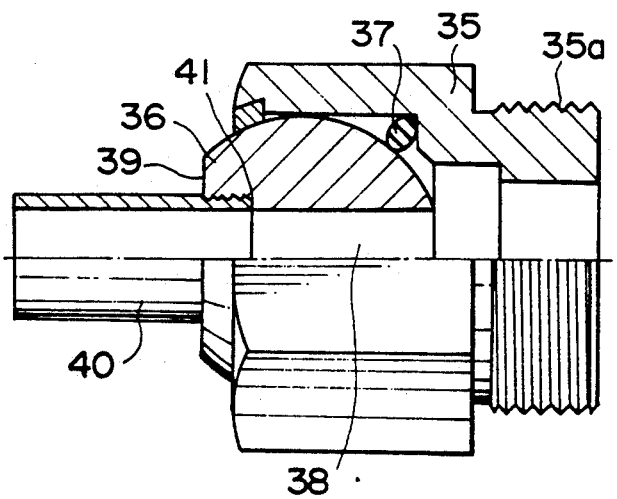
FIGS. 5 and 6 are schematic illustrations showing the typical prior art pivotal nozzle assembly for use in spraying liquid, such as lubricant, in a machining tool.
Figure 6:
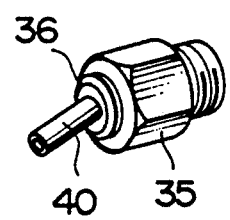

As best shown in FIG. 4, the nozzle assembly 1 includes a hollow nut section 1a whose outer shape has a six-facet nut shape and a hollow cylindrical section 1b whose outer surface is formed with a threaded section 1c. A spherical member 2 is rotatably received in the hollow nut section 1a such that the spherical member 2 may rotate in any desired direction therein. The spherical member 2 is formed with a through-hole 2a as a fluid passage, and the through-hole 2a is provided with a threaded section 2c over a predetermined length from its one end.

A fluid lead preventing member 3 having an elastic property, such as an O-ring, is interposed between the internal surface of the nut section 1a and the outer surface of the spherical member 2 at a location near the rear end of the spherical member 2 so as to prevent any leakage of liquid between the spherical member 2 and the nut section 1a even if the spherical member 2 rotatingly moves within the nut section 1a. The nut section 1a has its tip end caulked inwardly to define an inwardly extending tang 1d so that the spherical member 2 is kept in position even if the spherical member 2 may rotatingly move within the nut section 1a.

As best shown in FIG. 1, a relatively long pipe 4 is threaded into the threaded section 2c of the spherical member 2 so that the pipe 4 and the spherical member 2 are defined as a unit. A coupling member 5, such as a universal joint, is mounted on the pipe 4 by means of a holding member 6. With this structure, the pipe 4 serving as a nozzle of the nozzle assembly 1 may be directed in any desired direction within predetermined limits as being pivoted around a pivotal point which substantially corresponds to the center of the spherical member 2.

The cylindrical section 1b of the nozzle assembly 1 is threaded into a threaded hole 9 provided in a support projection 8 which is fixedly attached to a frame 7. The threaded hole 9 is in fluidic communication with a pair of liquid supply ports 10 and 11 formed in the support projection 8 below the threaded hole 9. These liquid supply ports 10 and 11 may be sealingly coupled to a liquid supply source. Thus, any desired liquid, such as lubricant or washing water, may be supplied to the pipe 4 from the source through the ports 10 and 11, cylindrical section 1b and the through-hole 2a.

One end of an L-shaped arm 12 is fixedly attached to the support member 6 and its other end is fixedly attached to an exposed end of a cylindrical transmission member 13 by means of a bolt 14. In the illustrated embodiment, a connecting point between the L-shaped arm 12 and the transmission member 13, or the location of the bolt 14, corresponds substantially in location in height with the center of the spherical member 2. Thus, as will be described in detail later, when the transmission member 13 rotates around its longitudinal axis, the horizontal section of the L-shaped arm 12 may rotate around the longitudinal axis of the transmission member 13 so that the pipe 4 may be pivoted in a direction perpendicular to the plane of FIG. 1.

The transmission member 13 is elongated and is supported to be rotatable around as well as movable along its longitudinal axis by a bearing member 15. The transmission member 13 is hollow at least partly and its inner peripheral surface is threaded. The length of this threaded section in the internal surface of the transmission member 13 determines the maximum stroke of the transmission member 13 along its longitudinal axis. A driver member 17 is threaded at its outer peripheral surface and thus is threaded into the transmission member 13. The driver member 17 is fixedly attached to the tip end of a motor shaft 16a of a motor 16 by means of a bolt 18. The transmission member 13 slidably extends through a rotary member 20 which is supported to be rotatable by means of a pair of rotary bearings 21a and 21b. A key 19 is fixedly attached to the outer peripheral surface of the transmission member 13 and the key 19 is in sliding engagement with a longitudinally extending guide groove 20a formed in the internal peripheral surface of the transmission member 13.

As a result, the transmission member 13 and the rotary member 20 rotate in unison; whereas, the transmission member 13 may move longitudinally relative to the rotary member 20, which is fixed in position along its longitudinal axis, through an engagement between the key 19 and the guide groove 20a. Thus, when the motor 16 is driven to rotate, the transmission member 13 is caused to move along its longitudinal axis in any direction depending on the direction of rotation of the motor 16 through a thread engagement between the driver member 17 and the transmission member 13, and, as a result, the L-shaped arm 12 is caused to move horizontally to thereby cause the pipe or nozzle 4 to execute a pivotal motion with the center of the spherical member 2 as a center of pivotal motion over an angle $\theta x = \theta xa + \theta xb$ in a plane of FIG. 1.

As briefly described above, the rotary member 20 is rotatably supported by a rotary bearing assembly 21 comprised of a pair of rotary bearings 21a and 21b. The rotary member 20 is provided with a plurality of teeth around its outer peripheral surface. An endless belt 22 having a plurality of teeth along its inner surface extends around the rotary member 20 so that the teeth of the endless belt 22 is in mesh with the teeth of the rotary member 20. The endless belt 22 also extends around a driver member 24 which is fixedly attached to a motor shaft 23a of a motor 23 by means of a bolt 25 and which has a plurality of teeth around its outer peripheral surface. Thus, the teeth of the endless belt 22 is also in mesh with the teeth of the driver member 24. The motor shaft 23a is also rotatably supported by a rotary bearing 26 which is fixedly mounted on the frame 7.

Figure 2:
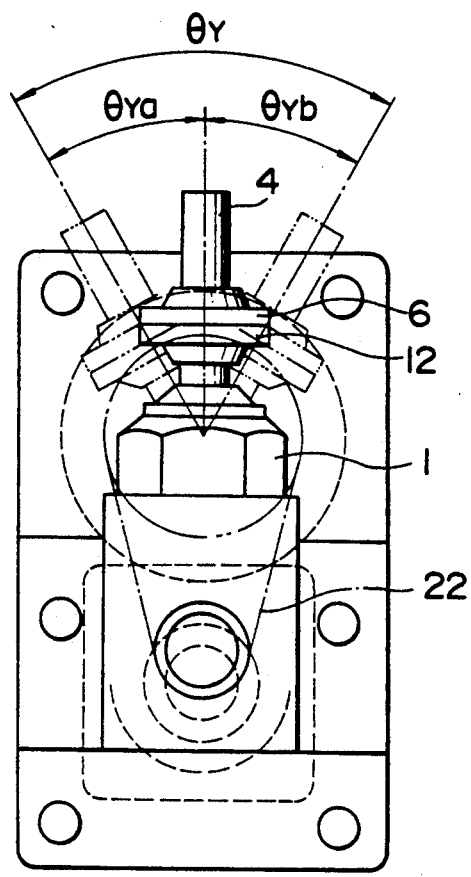
FIG. 2 is a schematic illustration showing in side elevation the apparatus shown in FIG. 1.
Figure 3:
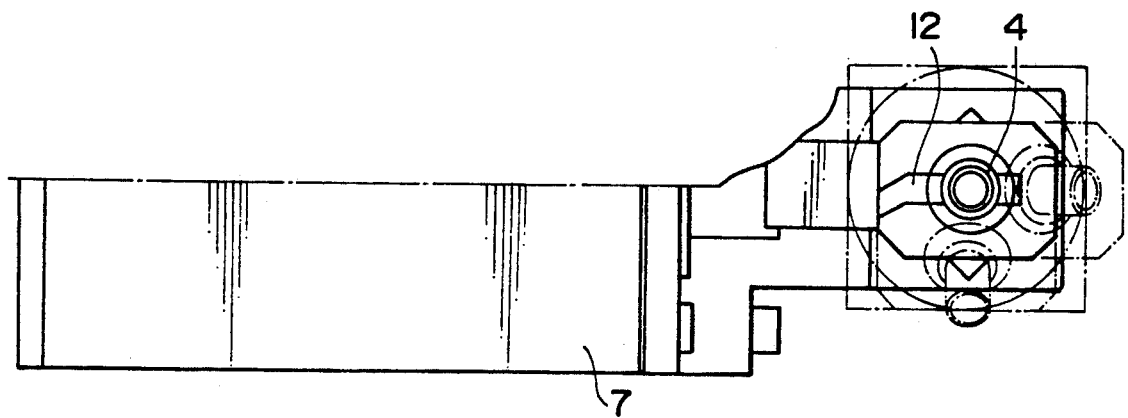
FIG. 3 is a schematic illustration showing in plan view the apparatus shown in FIG. 1.

With the above-described structure, when the motor 23 is driven to rotate, the rotary member 20 is driven to rotate in the same direction through the endless belt 22 extending between the driver member 24 and the rotary member 20. As a result, the transmission member 13 is also caused to rotate in unison with the rotary member 20 through an engagement between the key 19 and the guide groove 20a. Accordingly, the pipe 4 is caused to pivot substantially around the center of the spherical member 2 in a direction perpendicular to the plane of FIG. 1, or over an angle of $\theta y = \theta ya + \theta yb$ as indicated in FIG. 2.

Since the pipe 4 may be pivoted in mutually orthogonal directions by upper and lower motors 16 and 23, the pipe 4 may be pivoted in any desired direction within limits $\theta x$ in one direction and $\theta y$ in the perpendicular direction by simultaneous operation of these two motors 16 and 23. In other words, a jet stream of liquid may be sprayed by the pipe 4 in any desired direction within the above-described limits. For this purpose, in a preferred embodiment, a control circuit (not shown), including a microprocessor or the like, for controlling the operation of each of the motors 16 and 23 is provided. In this case, the direction of the pipe 4 may be controlled automatically according to a program stored in the control circuit and thus no human intervention is required during the operation of a machining tool on which the present liquid spraying apparatus is mounted.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A liquid spraying apparatus for use in a machining tool comprising:
    an elongated nozzle pipe;
    supporting means for supporting one end of said pipe pivotally on a frame such that said pipe may pivot around a predetermined pivotal point defined by said supporting means;
    moving means operatively coupled to said pipe for moving said pipe pivotally around said predetermined pivotal point within predetermined limits;
    first driving means fixedly mounted on said frame and operatively coupled to said moving means for driving to move said moving means in a first direction back and forth;
    second driving means fixedly mounted on said frame and operatively coupled to said moving means for driving to move said moving means in a second direction different from said first direction back and forth; and
    wherein said moving means includes an arm operatively coupled to said pipe and an elongated and hollow transmission member to which said arm is also fixedly attached, said transmission member being operatively coupled to said first and second driving means.

2. The apparatus of claim 1, wherein said supporting means includes a spherical member which is formed with a through-hole in communication with a passage in said pipe and which is fixedly attached to said pipe, said spherical member being rotatably received in a receiving member fixedly attached to said frame.

3. The apparatus of claim 2, further comprising a sealing means interposed between said spherical member and said receiving member and said receiving member is formed with a flow passage in communication with the through-hole in the spherical member and also with a flow passage formed in said frame.

4. The apparatus of claim 1, wherein said first driving means includes a first motor for causing said transmission member to move along a straight line back and forth, thereby causing said pipe to pivot around said predetermined pivotal point in a first direction over a first predetermined angle.

5. The apparatus of claim 4, wherein said arm is an L-shaped arm having a horizontal section which is operatively coupled to said pipe and a vertical section which is fixedly attached to said transmission member, and said second driving means includes a second motor for causing said transmission member to rotate around its longitudinal axis to thereby cause said pipe to pivot around said predetermined pivotal point in a second direction perpendicular to said first direction over a second predetermined angle.

* * * * *